United States Patent
Castrignano

(10) Patent No.: US 6,823,953 B2
(45) Date of Patent: Nov. 30, 2004

(54) CRAWLER VEHICLE WITH OSCILLATING TRACK CARRIAGES

(75) Inventor: Gianfranco Castrignano, Lecce (IT)

(73) Assignee: CNH America LLC, New Holland, PA (US)

(*) Notice: Subject to any disclaimer, the term of this patent is extended or adjusted under 35 U.S.C. 154(b) by 0 days.

(21) Appl. No.: 10/085,352

(22) Filed: Feb. 28, 2002

(65) Prior Publication Data

US 2002/0166675 A1 Nov. 14, 2002

(51) Int. Cl.$^7$ ............................................. B62D 55/00
(52) U.S. Cl. ........................ 180/9.46; 180/9.1; 180/9.5
(58) Field of Search ................................ 180/9.1, 9.44, 180/9.46, 9.5; 305/116, 124, 134

(56) References Cited

U.S. PATENT DOCUMENTS

| | | | | |
|---|---|---|---|---|
| 3,889,769 A | * | 6/1975 | Blomstrom | 180/9.5 |
| 3,974,891 A | * | 8/1976 | Persson | 180/9.44 |
| 4,364,443 A | * | 12/1982 | Sato et al. | 180/9.5 |
| 4,483,406 A | * | 11/1984 | Smith | 180/9.5 |
| 4,834,478 A | * | 5/1989 | Stevens et al. | 305/124 |
| 5,333,710 A | * | 8/1994 | Oertley | 180/9.5 |
| 5,358,064 A | * | 10/1994 | Oertley | 180/9.5 |
| 5,553,931 A | * | 9/1996 | Diekevers | 305/100 |
| 6,074,023 A | * | 6/2000 | Satou et al. | 305/116 |
| 6,378,635 B1 | * | 4/2002 | Yoshida et al. | 180/9.5 |

* cited by examiner

Primary Examiner—Lesley D. Morris
Assistant Examiner—L. Lum
(74) Attorney, Agent, or Firm—John William Stader; Collin A. Webb

(57) ABSTRACT

A crawler vehicle has a frame extending along a longitudinal axis of the vehicle, and two lateral track carriages oscillating with respect to the frame about a rear transverse axis. Each carriage is connected to a front cross member by a respective connecting assembly having a pin, which permits relative oscillation of the cross member and the carriage about a hinge axis perpendicular to the rear transverse axis, and has an eccentric portion for varying the effective length of the cross member between two given values as the carriages oscillate about the rear transverse axis.

13 Claims, 3 Drawing Sheets

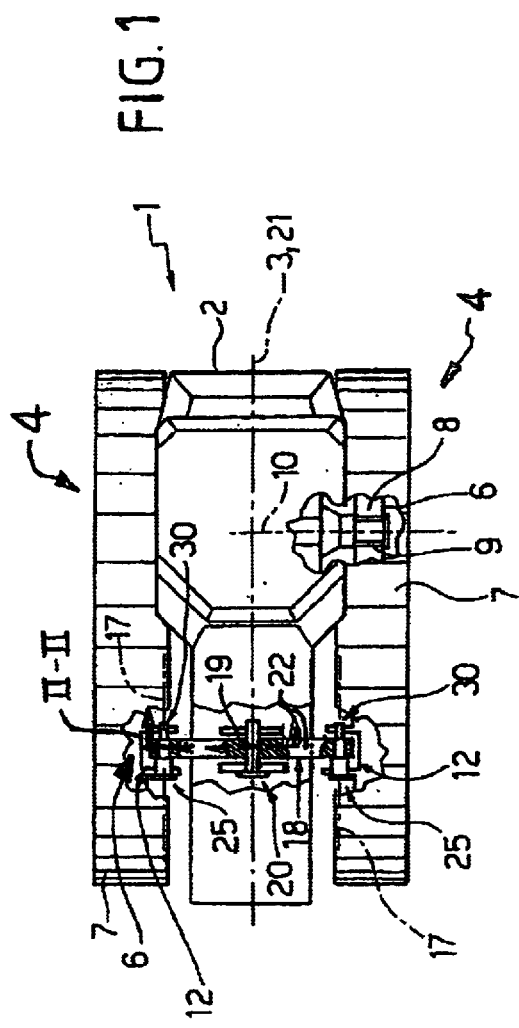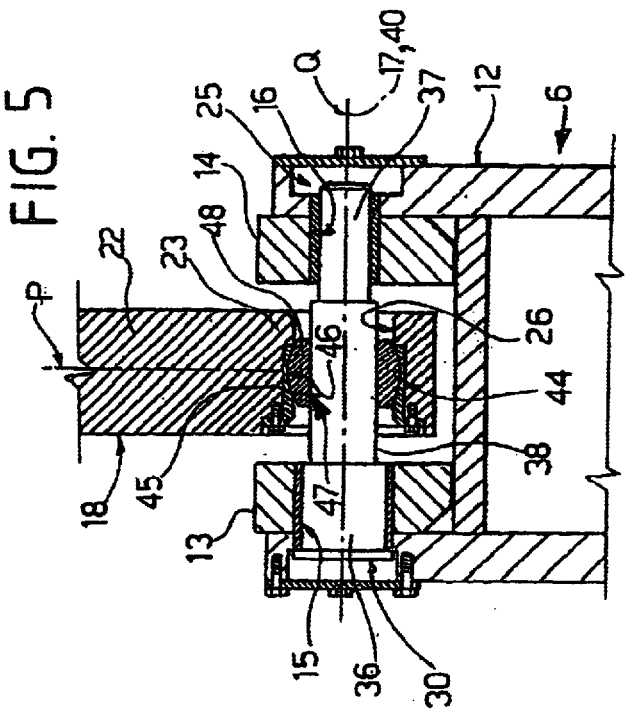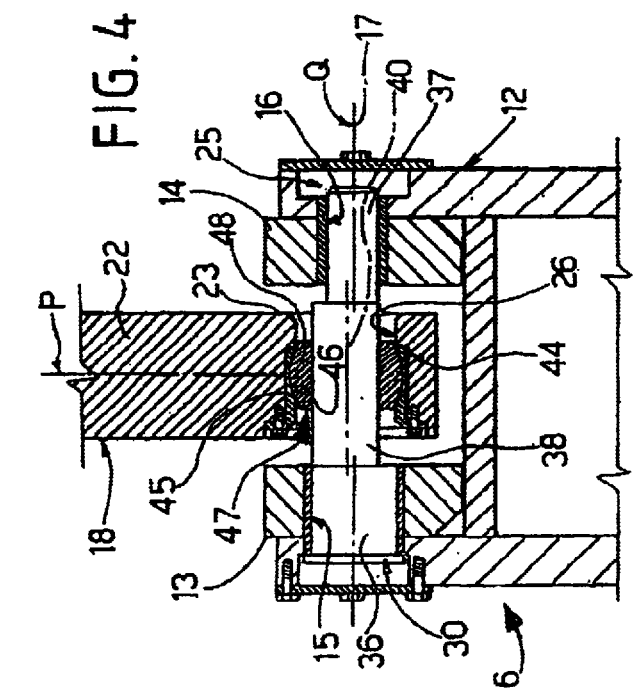

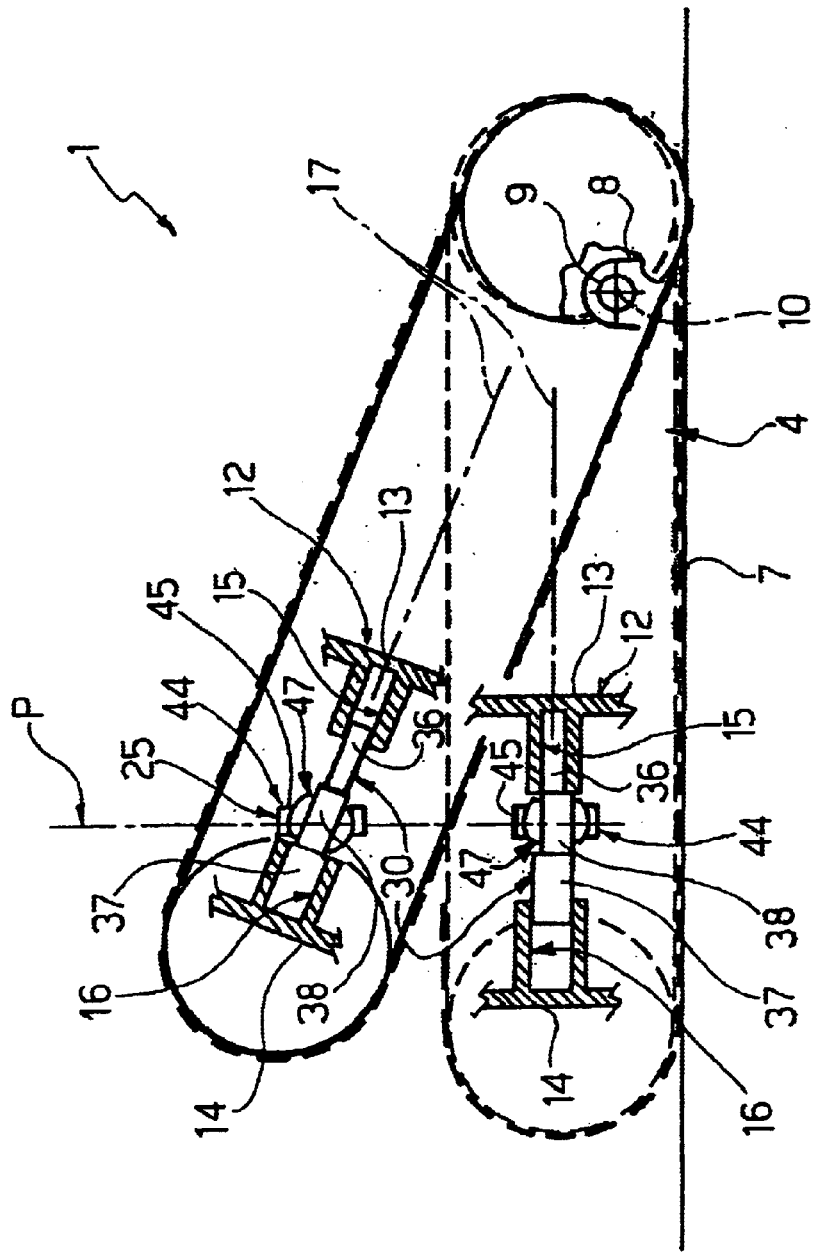

CRAWLER VEHICLE WITH OSCILLATING TRACK CARRIAGES

BACKGROUND OF THE INVENTION

The present invention relates to a crawler vehicle commonly referred to as a bulldozer, and, more particularly, to a crawler vehicle having oscillating track carriages. More specifically, the present invention relates to a vehicle having a longitudinal axis, a supporting frame, and two longitudinal carriages located on opposite sides of the frame.

The carriages support respective tracks for driving the vehicle, and are connected to the frame by respective rear pivots to rotate about a rear transverse axis and in a substantially vertical oscillating plane in dependence of the roughness of the ground over which the vehicle travels.

In vehicles of the type described above, the front end of each carriage commonly is connected to the frame by a vertical guide for guiding the movement of the carriage in the oscillating plane.

Given the rough conditions, particularly in terms of dust and mud, in which known crawler vehicles of the above type operate, the guides connecting the front ends of the carriages are subjected to severe wear and damage, and therefore call for continual maintenance and frequent replacement.

In an alternative solution, the front ends of the carriages are connected to each other by a front cross member, a central portion of which is hinged to the vehicle frame to rotate about a hinge axis parallel to the longitudinal axis. More specifically, each end of the cross member is hinged to the respective carriage by a cylindrical hinge pin perpendicular to the rear transverse axis.

This solution is also unsatisfactory on account of the severe and potentially dangerous bending and/or torsional stress to which the carriages, rear hinges and front hinge pins are subjected when operating over rough ground causing one carriage to rotate upwards and the other downwards in their respective oscillating planes.

In fact, as the carriages rotate increasingly in opposite directions about the rear transverse axis, the distance between the front ends of the carriages increases, whereas the front ends remain connected substantially rigidly to each other by the cross member, which thus generates stress and consequently strain on the carriages and, indirectly, on the rear hinges.

SUMMARY OF THE INVENTION

It is an object of the present invention to provide a crawler vehicle with oscillating track carriages, designed to provide a straightforward, low-cost solution to the aforementioned drawbacks.

According to the present invention, there is provided a crawler vehicle having a frame extending along a longitudinal axis; two track carriages on opposite sides of said frame; a first connecting device interposed between the carriage and the frame to permit oscillation of each carriage, with respect to the frame, about at least a first hinge axis extending perpendicularly to the longitudinal axis; a connecting cross member oriented substantially parallel to the first hinge axis; and a second connecting device interposed between the cross member and each carriage to permit relative oscillation of the cross member and the carriage about a second hinge axis extending perpendicularly to the first hinge axis.

The crawler vehicle includes a compensating mechanism for varying the length of the cross member between two given values as the carriages oscillate about the first hinge axis.

These and other objects, features and advantages are accomplished according to the instant invention in which a crawler vehicle has a frame extending along a longitudinal axis of the vehicle, and two lateral track carriages oscillating with respect to the frame about a rear transverse axis. Each carriage is connected to a front cross member by a respective connecting assembly having a pin, which permits relative oscillation of the cross member and the carriage about a hinge axis perpendicular to the rear transverse axis, and has an eccentric portion for varying the size of the cross member between two given values as the carriages oscillate about the rear transverse axis.

BRIEF DESCRIPTION OF THE DRAWINGS

The advantages of this invention will become apparent upon consideration of the following detailed disclosure of the invention, especially when taken in conjunction with the accompanying drawings, wherein:

FIG. 1 is a plan view, with parts removed for clarity, of a preferred embodiment of the crawler vehicle with oscillating track carriages according to the present invention;

FIGS. 4 and 5 are enlarged cross-sectional views taken along lines IV—IV and V—V, respectively, of FIG. 2, depicting two respective operating positions; and FIG. 6 is a partial side view of a variation of the connecting assembly 25 of the crawler vehicle depicted in FIGS. 1–5 with a track carriage in two different operating positions.

DETAILED DESCRIPTION OF THE PREFERRED EMBODIMENT

Figure 2:
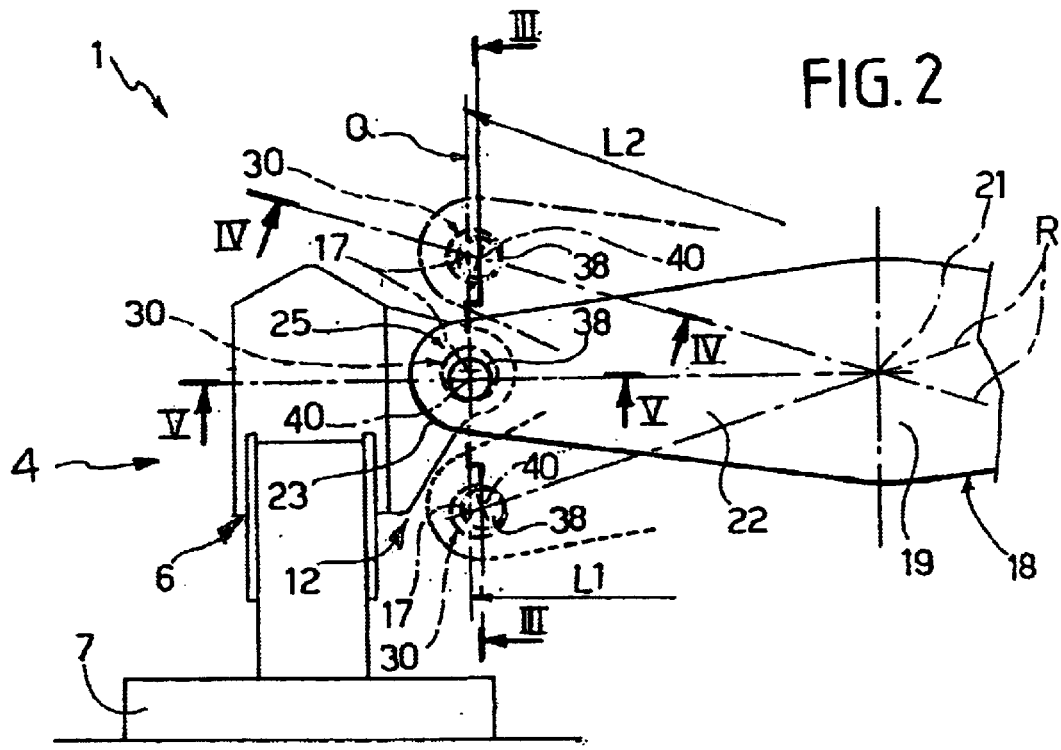
FIG. 2 is an enlarged cross-sectional front view taken along lines II—II of FIG 1, depicting the relative positions of the cross members 18 as the vehicle moves across level and rough terrain.

With reference to FIGS. 1 and 2, reference number 1 indicates a crawler vehicle normally used as an earthmoving machine, commonly referred to as a bulldozer. The crawler vehicle 1 has a longitudinal central axis 3, and includes a supporting frame 2 extending in the direction 3. Vehicle 1 further includes two track carriages 4 located on opposite sides of frame 2 and extending in directions substantially parallel to the axis 3.

With reference to FIGS. 1 and 2, each carriage 4 comprises a supporting structure 6 and a track 7, which is supported by and runs along the periphery of structure 6. Each track 7 is powered in known manner (not shown) to propel vehicle 1. Structures 6 comprise respective rear portions 8 connected to frame 2 by respective connecting assemblies 9 (not described in detail, and only one of which is shown in FIG. 1) enabling carriages 4 to oscillate, with respect to frame 2, about a horizontal hinge axis 10 perpendicular to direction 3, and on opposite sides of an intermediate reference position in which the carriages 4 are parallel to each other. Assemblies 9 allow a certain radial and axial clearance in the connection of rear portions 8 to frame 2.

With reference to FIGS. 1 to 5, structures 6 also comprise respective front connecting forks 12, each of which comprises two arms 13, 14 facing the frame 2 and defining respective cylindrical seats 15, 16 formed along a relative axis 17 perpendicular to the horizontal hinge axis 10.

The structures 6 are connected to each other and supported by a front suspension defined by a cross member 18, which is substantially parallel to the horizontal hinge axis 10 and, in turn, includes a central portion 19 connected to frame 2 by a known hinge device 20 (FIG. 1) to allow the cross member 18 to oscillate about a central axis 21 parallel to direction 3, and in a vertical plane P perpendicular to the central axis 21 (FIG. 3) and coincident with the FIG. 2 plane.

The cross member 18 is formed with two opposing arms 22, each terminating with a portion 23, which is interposed between arms 13, 14 of a respective fork 12 and is connected to the fork 12 by a connecting assembly 25 having seats 15, 16, a longitudinal seat 26 formed through the portion 23 (FIGS. 4 and 5), and a hinge pin 30 engaging seats 15, 26 and 16.

Figure 3:
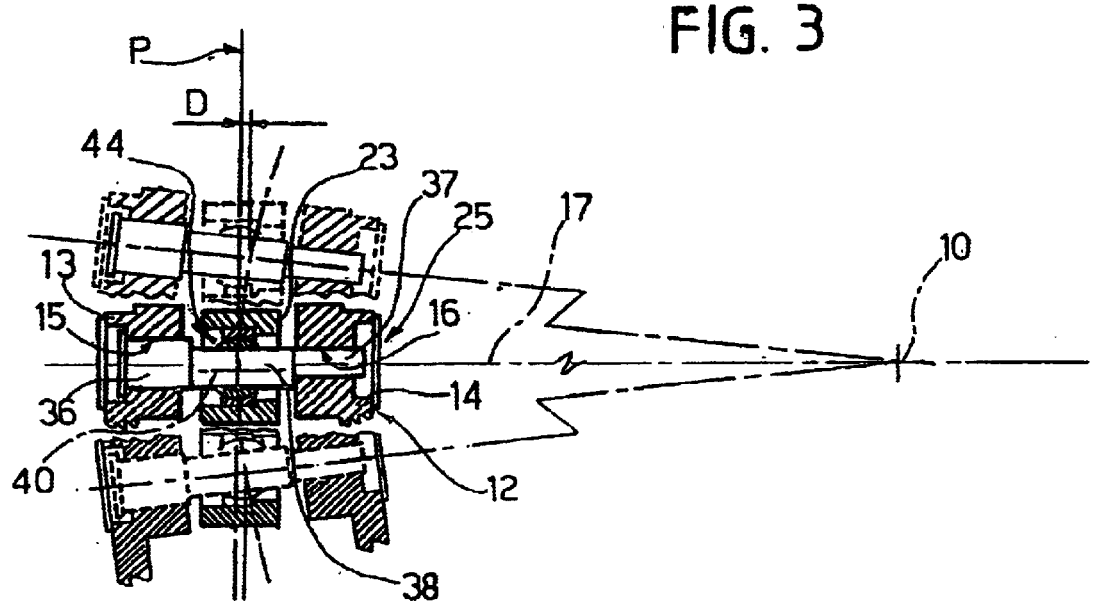
FIG. 3 is a cross-sectional view taken along lines III—III of FIG. 2.

With particular reference to FIGS. 3 to 5, the pin 30 includes two coaxial, opposite cylindrical end portions 36, 37, which engage respective the seats 15 and 16 along the axis 17 in axially-fixed, rotary manner to permit relative oscillation of the cross member 18 and each carriage 4 from the neutral position shown in solid line between the phantom positions, as seen in FIG. 3. The pin 30 further includes a cylindrical intermediate portion 38, which extends between the end portions 36 and 37 along with a respective axis 40 parallel to and offset with respect to the axis 17. The portion 38 has a diameter having a size between those of portions 36, 37, and has two diametrically opposite generating lines defining extensions of a respective upper generating line of the portion 36 and a lower generating line of portion 37, with respect to the view of FIG. 4.

The portion 38 engages the seat 26 and is connected to the portion 23 by the interposition of an articulated or spherical joint 44 forming part of the assembly 25 and having an outer ring 45 connected integrally to the portion 23 and defining a spherical seat 46; and an inner ring 47, connected to the portion 38, which is able to slide axially in opposite directions (FIG. 3) and including a spherical head 48 engaging the seat 46.

With reference to FIGS. 1 to 5, in actual use, the position of the carriages 4 with respect to the frame 2 adapts automatically in dependence of the roughness of the terrain. When vehicle 1 travels over flat ground, the carriages 4 remain in the intermediate reference position (FIG. 5 and the parts shown by the continuous lines in FIG. 2), and each pin 30 is set to a first operating position in which the respective axes 17 and 40 are parallel to the central axis 21 and lie in a plane Q perpendicular to the horizontal hinge axis 10 and parallel to the oscillating planes of the carriages 4. Conversely, when vehicle 1 travels through a dip or over a bump, the carriages 4 rotate in opposite directions about the horizontal hinge axis 10, so that the cross member 18 rocks about the central axis 21 in the plane P. As the carriages 4 and the cross member 18 oscillate, the axes 17 are retained by the structures 6 to rotate about the horizontal hinge axis 10 in respective planes Q, while the axes 40 are retained by the cross member 18 and articulated the joints 44 to rotate about the central axis 21. As a result of the difference between the trajectories of the axes 17 and 40 in plane P, each pin 30 rotates in their seats 15, 16 about respective axes 17 automatically so as to vary the effective length of the cross member 18, i.e., the difference between the respective axes 17.

Each pin 30 is free to rotate from the first operating position (FIGS. 2 and 5), in which the cross member 18 is of a length of value L1 (FIG. 2), to a second limit operating position (FIGS. 2 and 4), in which the axes 17, 40 intersect the same line R, radial with respect to the central axis 21, and the effective length of the cross member 18 takes up a value L2 greater than L1. More specifically, the difference between values L1 and L2 equals twice the eccentricity of the portion 38.

At the same time, each articulated joint 44 adapts the tilt of the respective pin 30 to that of the cross member 18, while the sliding connection of the inner ring 47 to the portion 38 provides for guiding the pin 30 axially and compensating for the difference D between the trajectories travelled by the fork 12 and the portion 23 along the axis 17 (FIG. 3) as a carriage 4 oscillates.

FIG. 6 shows, schematically, a variation of the assembly 25, in which the inner ring 47 is connected integrally to the portion 38 of the guiding pin 30, while the arms 13, 14 define respective guiding seats 15, 16 along the axis 17, and the portions 36, 37 define respective slides connected in axially-sliding manner to the arms 13, 14. As will be appreciated from FIG. 6, the outer ring 45 connected integrally to the cross member 18 is enabled to remain in the plane P during pivotal movement of a the carriage 4 around the axis 10 by virtue of the sliding movement of the pin 30 inside the seats 15, 16.

At the same time, the clearance between the structures 6 and the frame 2 allowed by the rear connecting assemblies 9, together with the pins 30, enables each carriage 4 to also oscillate about any axis crosswise to horizontal hinge axis 10, and to adapt its lateral position, parallel to horizontal hinge axis 10, by relatively small movements, but sufficient to further improve the ability of the carriage 4 to adapt to the roughness of the terrain over which the vehicle 1 travels.

The position of the carriages 4 with respect to the frame 2 can therefore be adapted according to the roughness of the terrain without generating severe stress or strain on the structures 6 or the assemblies 9, 25. The assemblies 25, in fact, enable each carriage 4 to adapt its position with respect to the cross member 18 in practically any direction in space. Such adaptation happens in a controlled, as opposed to random, manner, by means of the articulated joint 44 and, in particular, by the pin 30, the position of which is variable between two limit operating positions determined by the eccentricity of the portion 38.

The assembly 25 is also reliable in design, since the connection between the forks 12 and the pin 30 is protected in a relatively straightforward manner against external agents, such as dust. Moreover, by virtue of its shape, the pin 30 can be assembled relatively easily in one operation, by inserting it axially inside the seat 15, through the inner ring 47, and into the seat 16.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

In particular, compensating devices other than the pins 30 may be provided to vary the length of the cross member 18, and/or connecting assemblies other than the articulated joint 44 may be interposed between the portion 38 and the end portion 23.

Moreover, the articulated joint 44 may be carried by the structure 6 as opposed to the cross member 18, and the pin 30 may be carried by a fork integral with the cross member 18.

Having thus described the invention, what is claimed is:

1. In a crawler vehicle having a longitudinal axis; a frame extending along said longitudinal axis; two track carriages on opposite sides of said frame; first connecting device interposed between each said carriage and said frame to permit oscillation of each said carriage, with respect to said frame, about at least a first hinge axis perpendicular to said longitudinal axis; a connecting cross member substantially parallel to said first hinge axis; and second connecting device interposed between said cross member and each said carriage to permit relative oscillation of said cross member and the carriage about a second hinge axis perpendicular to said first hinge axis, the improvement comprising:

compensating mechanism for varying an effective length of said cross member between two given values as said carriages oscillate about said first hinge axis, said compensating mechanism comprising, for each said carriage, a cylindrical body connected to one of said cross member and said carriage so as to rotate about the second hinge axis and comprising an eccentric portion and a connecting apparatus being provided to connect said eccentric portion to the other said cross member and said carriage.

2. The crawler vehicle of claim 1 wherein said compensating mechanism forms part of said second connecting device.

3. The crawler vehicle of claim 1 wherein said connecting apparatus comprises a spherical joint.

4. The crawler vehicle of claim 3 wherein each said spherical joint comprises a spherical head carried by an associated eccentric portion; and a spherical seat engaged by said spherical head and carried by said cross member.

5. The crawler vehicle of claim 4 wherein each said cylindrical body is connected to the relative carriage in a fixed axial position along said second hinge axis; and in that each said spherical head is connected to the relative said eccentric portion in a manner to slide in opposite directions along the second hinge axis.

6. The crawler vehicle of claim 4 wherein each said spherical head is connected integrally to said eccentric portion; and in that each said cylindrical body includes a slide associated with a guide carried by the relative carriage and permitting relative axial translation in opposite directions of said eccentric portion along said second hinge axis.

7. The crawler vehicle of claim 6 wherein each said cylindrical body comprises two coaxial cylindrical end portions on opposite axial sides of said eccentric portion.

8. The crawler vehicle of claim 7 wherein diameters of said two coaxial cylindrical end portions are different.

9. The crawler vehicle of claim 8 wherein said eccentric portion has a diameter between those of said cylindrical end portions.

10. The crawler vehicle of claim 9 wherein an axial projection of said eccentric portion along said second hinge axis is fully circumscribed by an axial projection of the of the cylindrical end portions facilitating mounting of the cylindrical body in associated seats.

11. The crawler vehicle of claim 10 wherein said first connecting device allows each said carriage to oscillate, with respect to said frame, about at least one axis crosswise to said first hinge axis.

12. The crawler vehicle of claim 11 wherein a difference of the two cylindrical end portions equals twice an eccentricity of said eccentric portion.

13. The crawler vehicle of claim 12 wherein the compensating mechanism is operable to compensate for any difference in trajectory between the track carriages and the connecting cross member in three planes upon said carriages oscillating about said first hinge axis.

* * * * *